US012729746B2

(12) United States Patent
Di Meco et al.

(10) Patent No.: US 12,729,746 B2
(45) Date of Patent: Sep. 8, 2026

(54) POWER TRANSMISSION BELT AND CORRESPONDING TRANSMISSION SYSTEM

(71) Applicant: DAYCO EUROPE S.R.L., Chieti (IT)

(72) Inventors: Marco Di Meco, Chieti (IT); Fabio Nardone, Chieti (IT); Carlo Piermatteo, Chieti (IT); Massimiliano Delli Rocioli, Chieti (IT)

(73) Assignee: DAYCO EUROPE S.R.L., Chieti (IT)

( * ) Notice: Subject to any disclaimer, the term of this patent is extended or adjusted under 35 U.S.C. 154(b) by 0 days.

(21) Appl. No.: 18/994,763

(22) PCT Filed: Jul. 17, 2023

(86) PCT No.: PCT/IB2023/057266
§ 371 (c)(1),
(2) Date: Jan. 15, 2025

(87) PCT Pub. No.: WO2024/018358
PCT Pub. Date: Jan. 25, 2024

(65) Prior Publication Data

US 2026/0029036 A1 Jan. 29, 2026

(30) Foreign Application Priority Data

Jul. 19, 2022 (IT) ........................ 102022000015111

(51) Int. Cl.
*F16G 1/28* (2006.01)
*F16H 7/02* (2006.01)

(52) U.S. Cl.
CPC ................ *F16G 1/28* (2013.01); *F16H 7/023* (2013.01)

(58) Field of Classification Search
CPC .................................. F16G 1/28; F16H 7/023
USPC .......................................................... 474/205
See application file for complete search history.

(56) References Cited

U.S. PATENT DOCUMENTS 5,599,246 A * 2/1997 Fujiwara ................ C08K 5/103 474/271
5,611,745 A * 3/1997 Uto ........................... F16G 1/28 474/267
6,485,386 B2 * 11/2002 Yuan ......................... F16G 1/28 474/205
7,749,118 B2 * 7/2010 Baldovino ................ F16G 1/28 474/205

(Continued)

FOREIGN PATENT DOCUMENTS

WO 2021130694 A1 7/2021

OTHER PUBLICATIONS

International Search Report and Written Opinion, Application No. PCT/IB2023/057266, Sep. 12, 2023, p. 1-13.

*Primary Examiner* — Henry Y Liu
(74) *Attorney, Agent, or Firm* — FisherBroyles, LLP; Susan M. Oiler

(57) ABSTRACT

A power transmission belt has a belt body, a plurality of cords embedded in the belt body, a back, and a plurality of teeth. The back and/or the teeth are covered with a covering material that is either a woven fabric or a knitted fabric. At least 60% by weight of the total weight of the belt body is an elastomeric material formed of a mixture of one or more copolymers obtained from a diene monomer and a monomer containing nitrile groups that are modified with a salt of an unsaturated carboxylic acid.

11 Claims, 2 Drawing Sheets

(56) References Cited

U.S. PATENT DOCUMENTS 7,909,720 B2 * 3/2011 Burrowes ................. B32B 9/04 474/271
8,142,316 B2 * 3/2012 Goettsch ................... F16G 5/20 474/271
8,388,477 B2 * 3/2013 Baldovino ............. D02G 3/447 474/205
8,426,524 B2 * 4/2013 Piccirilli ................... F16G 1/28 525/232
8,568,260 B2 * 10/2013 Baldovino ................ F16G 1/28 474/271
8,859,081 B2 * 10/2014 Baldovino .............. B32B 25/10 524/565
9,322,455 B2 * 4/2016 Di Meco ................... F16G 1/28
9,382,969 B2 * 7/2016 Kucharczyk .............. F16G 1/28
10,626,546 B2 * 4/2020 Knox ...................... D01F 11/16
10,844,931 B2 * 11/2020 McNamee ............. B29D 29/08
11,326,665 B2 * 5/2022 Ozaki ....................... F16G 1/00
11,480,231 B2 * 10/2022 Parziale .............. F16H 57/0489
11,885,392 B2 * 1/2024 Mitsutomi ............. B29D 29/08
2005/0113200 A1 * 5/2005 Okuno .................... F16G 5/166 474/237
2006/0287148 A1 * 12/2006 Wood ........................ F16G 1/28 474/263
2007/0232429 A1 * 10/2007 Knox ........................ F16G 1/28 474/260
2007/0240658 A1 * 10/2007 Baldovino ................ F16G 1/28 123/90.31
2007/0281814 A1 * 12/2007 Baldovino ............. D02G 3/447 474/205
2008/0064548 A1 * 3/2008 Abate ...................... H04N 1/40 474/205
2008/0132370 A1 * 6/2008 Goettsch ................... F16G 1/28 474/268
2008/0139709 A1 * 6/2008 Piccirilli ................... F16G 1/28 524/106
2010/0004082 A1 * 1/2010 Di Meco ................... F16G 1/28 474/205
2010/0240481 A1 * 9/2010 Baldovino ............. D02G 3/447 474/205
2010/0255259 A1 * 10/2010 Baldovino ................ B32B 3/30 524/565
2010/0304909 A1 * 12/2010 Baldovino ................ F16G 1/28 474/202
2011/0263367 A1 * 10/2011 Baldovino ................ F16G 1/28 474/204
2012/0142471 A1 * 6/2012 Gaska ....................... F16G 1/28 427/389.9
2012/0149510 A1 * 6/2012 Baldovino ............. C08L 23/16 474/204
2012/0157251 A1 * 6/2012 Di Meco ................... F16G 1/28 156/137
2012/0192822 A1 * 8/2012 Rolando ................... F16G 1/28 123/90.31
2012/0309573 A1 * 12/2012 Well .......................... F16G 1/10 474/205
2013/0040771 A1 * 2/2013 Well .......................... F16G 1/28 474/205
2014/0080647 A1 * 3/2014 Sakamoto ................. F16G 1/28 474/205
2014/0206487 A1 * 7/2014 Tomobuchi .............. C08J 5/046 474/205
2014/0238581 A1 * 8/2014 Brocke ..................... F16G 1/10 156/137
2014/0243134 A1 * 8/2014 Kucharczyk ............. C08J 5/243 427/389.9
2015/0005123 A1 * 1/2015 Di Meco ................... F16G 9/04 474/205
2015/0111677 A1 * 4/2015 Nishiyama ................ F16G 5/08 474/264
2015/0152590 A1 * 6/2015 Knox ....................... C08K 9/04 524/556
2015/0152941 A1 * 6/2015 Sekiguchi ................ B62D 5/04 474/205
2016/0040749 A1 * 2/2016 Kageyama ................ B32B 3/30 474/8
2016/0053850 A1 * 2/2016 Brocke ..................... F16G 1/10 474/205
2016/0069420 A1 * 3/2016 Sekiguchi ................. F16G 1/10 264/157
2017/0023100 A1 * 1/2017 Di Meco ................... F16G 1/28
2017/0082174 A1 * 3/2017 Parziale .............. F16H 57/0489
2017/0299017 A1 * 10/2017 Gregg ....................... F16G 1/04
2017/0312939 A1 * 11/2017 Lofgren ................... C08J 5/042
2018/0313431 A1 * 11/2018 McNamee ................ F16G 1/28
2019/0315898 A1 * 10/2019 Casagrande ............. C08K 7/14
2020/0200232 A1 * 6/2020 Ozaki ....................... F16G 1/28
2020/0378470 A1 * 12/2020 Parziale .................. F16H 7/023
2021/0040682 A1 * 2/2021 Shimokawa .............. F16G 1/28
2021/0396297 A1 * 12/2021 Mitsutomi ............... C08K 3/22

* cited by examiner

POWER TRANSMISSION BELT AND CORRESPONDING TRANSMISSION SYSTEM

CROSS-REFERENCE TO RELATED APPLICATIONS

The present invention is filed under 35 U.S.C. § 371 as the U.S. National Phase of International Patent Application No. PCT/IB2023/057266, filed Jul. 17, 2023, which designated the United States and which claims the benefit of Italian Patent Application No. 102022000015111, filed on Jul. 19, 2022, the entire disclosure of which is incorporated herein by reference.

TECHNICAL FIELD

The present invention relates to a power transmission belt and, in particular, to a toothed belt and the corresponding transmission system.

PRIOR ART

The present invention is preferably used for the motion transmission in a transmission unit comprising a motor.

The motion transmission preferably takes place using synchronous power transmission belts, also known as toothed belt.

The belt can also be used for motion transmission in motor vehicles.

The transmission belts generally comprise a body made of an elastomeric material, preferably HNBR for the toothed belts, a plurality of resistant thread-like inserts embedded longitudinally in the body, and a coupling portion integrally connected to the body and comprising a plurality of teeth transverse to the sliding direction of the belt in use in the case of toothed belts.

Current motors require that the transmission parts and in particular the transmission belts are suitable to have an ever-increasing average life even if operating in high temperature conditions and under much greater mechanical stress.

In order to increase the average life of the transmission belt by reducing the abrasion thereof, it is known to arrange a layer of a material more resistant to abrasion such as for example a fabric, a non-woven fabric or a thermoplastic material which at least partially covers the teeth.

Several alternative technical solutions have been tried to simultaneously obtain a high elastic modulus sufficient to obtain maximum performance and a long life for the belt.

We are therefore continuously looking for more performing transmission belts that allow us to satisfy the increasingly stringent specifications imposed by car manufacturers and which, in particular, allow us to withstand more work cycles for the same torque or that are able to transmit more torque for the same work cycles.

SUMMARY OF THE INVENTION

The object of the present invention is to produce a transmission belt which solves the aforementioned problems and is achieved by a power transmission belt that has a body, a plurality of cords embedded in the body, a back optionally covered by a covering, and a plurality of teeth or ribs covered by a covering. The body has an elastomer material that is at least 60% by weight with respect to the total weight of the body and that is formed of a mixture of one or more copolymers, each of which is obtained from a diene monomer and a monomer containing nitrile groups modified with a salt of an unsaturated carboxylic acid. Also, the body has a tensile strength of more than 40 MPa.

In another aspect, power transmission systems are disclosed that include a power transmission belt as described herein as part of an engine transmission system which includes a pulley configured to mesh with the power transmission belt.

DESCRIPTION OF THE INVENTION

With "main elastomer" it is meant that the same is provided in the compound that forms the belt body for at least more than 60% by weight calculated on the total weight of all the components in the compound, therefore including all types of additives or fillers or elastomers.

With "first elastomeric material essentially formed of" it is meant that in addition to additives, it is possible to add small percentages of other polymers or copolymers to the compound without negatively affecting the functionality and chemical compatibility between the body compound and the other elements forming the toothed belt and therefore without departing from the scope of the present invention.

Figure 1:
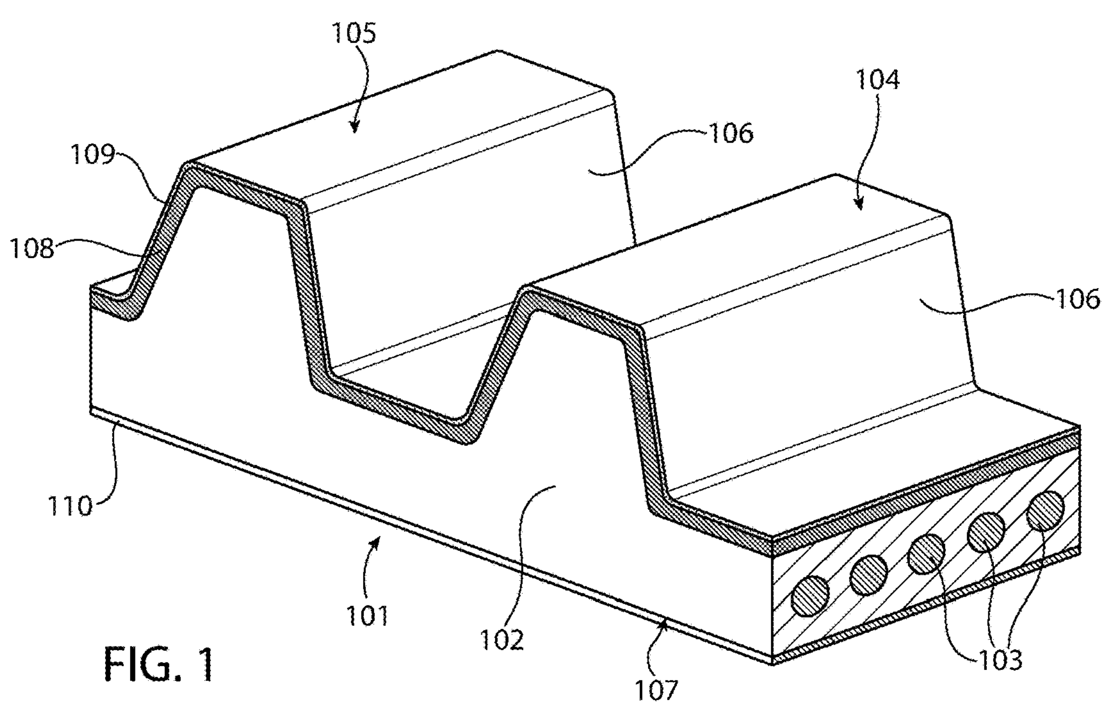
FIG. 1 is a schematic and partial view of a portion of a toothed belt

In one embodiment of the invention in FIG. 1 a toothed belt is indicated as a whole with 101. The belt 101 comprises a body 102. A plurality of resistant longitudinal thread-like inserts 103, also alternatively known as "cord", are embedded in the body 102.

The belt also comprises a toothing 104 made up of a plurality of teeth 106 which in use form the working surface 105, namely, the surface which meshes with a corresponding pulley of the transmission system.

The toothed belt further comprises a back 107 opposite to the working surface 105.

Alternatively, the belt is of the so-called poly-V type and has longitudinal ribs instead of teeth.

Advantageously, the pitch of the toothing of the toothed belt is comprised between 3 mm and 20 mm, more preferably comprised between 5 mm and 14 mm, for example 9.525 ideal for vehicle applications or 8 mm ideal for industrial or bicycle applications.

Preferably the body 102 comprises an elastomeric compound comprising a main elastomeric material, but can also contain more than one elastomer.

The body 102 of the toothed belt therefore advantageously comprises at least 60% by weight, preferably 70% by weight, more preferably 80% by weight of an elastomeric material formed of a mixture of one or more copolymers, obtained from a diene monomer and a monomer containing nitrile groups, modified with a salt of an unsaturated carboxylic acid.

By weight of the body, is meant only the weight of the compound forming the body and not of the cords and/or fabric and of any treatments applied to these last two components of the toothed belt.

In other words, the weight is considered the total weight of the body, namely, of all the components forming the body, therefore both the elastomeric ones and all the other additives normally added to the compound, but excluding the other components of the belt such as cord, fabric, and related treatments. Assumed as 100 the weight of the compound forming the body, made up of elastomers and all the additives, at least 60% refers to the percentage fraction by weight of the elastomeric part. In other words, the elastomers of the invention form at least 60% by weight with respect to the total weight of the compound.

Generally, in fact, the compound which forms the belt body comprises a series of additional components in addition to the elastomer or elastomers such as for example a vulcanization agent to facilitate cross-linking of the compound and other additives having different functions.

Generally, the compounds forming the body furthermore also comprise fillers, such as, for example, carbon black, which are also added in quantities greater by weight with respect to the elastomers themselves.

In the embodiment according to this preferred embodiment, the compound preferably has no filler or has filler in an amount of less than 5% by weight as dye.

Furthermore, the compound comprises a small amount of additives up to only 30% by weight, more preferably 20% by weight, even more preferably up to 15% by weight.

It has been surprisingly noted that when at least 60% of the weight of an elastomeric material formed of a mixture of one or more copolymers, obtained from a diene monomer and a monomer containing nitrile groups, modified with a salt of an unsaturated carboxylic acid is added the performance of the belt improves and a longer life is obtained.

Preferably the acrylonitrile units in the polymer are comprised between 18 and 45%.

Preferably the preferred saturation level is over 90%.

According to the preferred embodiment of the present invention, not only is there a choice of a particular elastomer as the main elastomer of the compound, but it has been noted that by removing the fillers and also a good part of the additives it is possible to obtain optimal results in any case, in particular in some applications, comprising preferably some industrial applications.

Said result is surprising if one considers that even by completely replacing the elastomeric materials normally used for toothed belts such as HNBR or NBR entirely with an elastomeric material formed of a mixture of one or more copolymers, obtained from a diene monomer and a monomer containing nitrile groups, modified with a salt of an unsaturated carboxylic acid, the weight percentage of elastomer within the compound would in any case be lower than 50% by weight or more commonly lower than 30% by weight. In fact, fillers are generally used in a quantity by weight higher than that of the elastomer, also because the fillers have a lower cost and numerous additives are also introduced in significant percentages.

Conversely, according to the preferred embodiment, not only is the main component of the compound an elastomeric material formed of a mixture of one or more copolymers, obtained from a diene monomer and a monomer containing nitrile groups, modified with a salt of an unsaturated carboxylic acidic acid, but also the number and weight percentage of the additives is much lower than in the compounds normally used.

Preferably, furthermore, the compound of the body 102 comprises a single elastomer.

By a single elastomer it is meant that the body can contain impurities or small percentages of another material without substantially affecting the performance of the belt.

Surprisingly, it was found that the belt has a longer life and has improved performance in terms of torque and number of work cycles.

Although the embodiment in which the body compound comprises a single elastomer is preferable, it is also possible to add further elastomers such as for example nitrile rubbers, advantageously acrylonitrile butadiene rubber, known by the acronym NBR. Alternatively hydrogenated acrylonitrile butadiene rubber or HNBR or also XHNBR, namely, hydrogenated carboxylated acrylonitrile butadiene rubber.

The body 102 thus preferably comprises as further elastomeric material at least one polyolefin copolymer or a rubber containing acrylonitrile units which is not modified with a salt of an unsaturated carboxylic acid.

More advantageously, the unsaturated carboxylic acid is methacrylic or acrylic acid and said salt is a zinc salt of methacrylic or acrylic acid. Even more advantageously, a zinc salt of methacrylic acid is used.

For example, the elastomers sold by Zeon under the names: ZSC 1295, ZSC 2095, ZSC 2195, ZSC 2295, ZSC 2295L, ZSC 2295R and ZSC 2395, ZSC2195CX are advantageously used.

The body compound in addition to the elastomeric materials can comprise conventional additives such as, for example, fillers, pigments, stearic acid, reinforcing agents, accelerators, curing agents, antioxidants, activators, initiators, plasticizers, waxes, pre-vulcanization inhibitors, antidegradants, process oils and the like.

Advantageously, the body compound further comprises reinforcing fibres, more advantageously, the compound comprises between 1 and 20% by weight, more preferably between 5 and 15% by weight of fibres.

The reinforcing fibres have a length comprised between 0.1 and 10 mm, preferably comprised between 1 and 6 mm, even more preferably comprised between 1 and 3 mm.

The use of fibres allows to further increase the mechanical characteristics of the mixture which forms the body.

The fibres are therefore present throughout the body, comprising the area surrounding the cords and this allows for greater rigidity.

Preferably, the fibres are chopped fibres.

The reinforcing fibres preferably comprise at least one substance selected from the group consisting of polyamide, aromatic polyamide, polyester, glass, PBO, carbon fibres, more advantageously being aromatic polyamides or aramids, for example Technora© fibres, which can be made to adhere to the mixture by means of a treatment, preferably RFL-based.

The treatment used can also have a base of VP-SBR, namely, a vinylpyridine styrenebutadiene copolymer.

Aramid fibres have proven to be particularly effective, such as, for example, the Technora® fibres by Teijn with a length of 3 mm.

The cords 103 are formed of a plurality of threads or filaments or yarns and each thread is formed of a plurality of filaments.

The cords preferably comprise high modulus fibres, more preferably of at least one material selected from the group consisting of carbon, PBO, aramid, polyamide, glass or polyester fibres.

The cords can advantageously be of the “hybrid” type, that is, formed of at least a first fibrous material and a second fibrous material.

The use of cords 103 made of two materials in the form of different fibres or filaments allows for better adhesion of the cord 3 to the mixture which forms the belt body.

Cords 103 are preferably treated with a water-based treatment known as reactive impregnation, but they can also be treated in the same way or with RFL, that is, a latex, resorcinol and formaldehyde based compound.

In the event that the cords 3 comprise two fibrous materials, both the first and the second material are preferably selected from the group consisting of glass fibres, aramid fibres, polyester fibres, carbon fibres, PBO fibres, polyamide fibres, polyketone (POK) fibres, PEEK fibres, polyvinyl acetate (PVA) fibres, liquid crystal (LPC) fibres and PEN fibres.

The first material preferably has a lower modulus than the second material and is preferably twisted around the second material.

Preferably, in cross section the second material occupies a surface comprised between 15 and 75% with respect to the overall surface of the section. Even more preferably, the second material occupies a surface comprised between 45 and 55% with respect to the overall surface.

Even more advantageously, in cross section the fibres of the two materials occupy similar surfaces, so as to balance the positive characteristics of both as much as possible in order to obtain the best performance on the tape.

The first material is preferably glass fibre and the second material is preferably carbon fibre.

Preferably, the fibres of the first material are twisted around the fibres of the second material so as to coat the fibres of the first material externally at least in part, and even more preferably to coat the fibres of the second material entirely.

Preferably, the cords 103 have a twist of the Lang's Twist type, that is, with two twists in the same direction.

The number of filaments that form the cord, as well as the number of basic filaments or the count or the entire forming of the insert, can be varied.

In order to obtain the best performance, the number of threads formed of the fibres of the first material is preferably comprised between 3 and 18, preferably comprised between 8 and 15.

The number of yarns formed of the fibres of the second material is preferably comprised between 1 and 5, more preferably comprised between 1 and 3, even more preferably 1. The first material is preferably a low-density fabric.

The first material is preferably a low modulus fibre, more preferably a fibre selected from the group consisting of glass, aramid, PA, PET.

The second material is preferably a high modulus fibre, preferably a fibre selected from the group consisting of carbon and PBO, even more preferably carbon.

A purely indicative example of cord 103 comprises 12 glass threads which completely surround 1 carbon thread.

To form the cords 103, the glass filaments are preferably treated with an aqueous-based treatment known as reactive impregnation, but other RFL-based treatments can also be used.

The filaments are then twisted a first time to form a yarn. Next, the yarns are twisted around a carbon fibre yarn.

In this way, the yarns form an insert, preferably with dimensions ranging from 0.7 to 1.4 mm, in particular 1.15 mm.

An example of said configuration is known with the acronym 22 tex 3*12, 400 Tex*1.

The first twisting operation to which the filaments are subjected to form the twists consists of a number of twists in a first direction S (clockwise).

The second twisting operation to which the twists are subjected when they are twisted around the carbon fibre consists again of twisting and is performed in the same direction S, so as to form cords indicated as S.

These cords therefore have a Lang-type twist, that is, two twists in the same direction.

The twists that the carbon fibre filaments undergo to form a twist are in the same first direction S.

By using the same method and procedure, the cords 103 are twisted both times in an opposite direction to the first, that is, in a direction indicated as Z (counterclockwise) to form the cords Z.

To form the belt, the cords S and Z are preferably deposited simultaneously on the mould with a spiral pitch ranging, for example, between 1.5 and 5 mm, advantageously between 2.0 and 3.5 mm, more advantageously between 2, 1 and 2.6 mm, for example 2.56 mm, where this measurement means the distance between the central point of two cords having the same twist.

Advantageously, the latex of the treatment preferably comprises an elastomer.

The embodiment in which the elastomer of the treatment for the cords comprises an aqueous solution comprising at least one elastomeric material formed of a mixture of one or more copolymers, obtained from a diene monomer and d a monomer containing nitrile groups, is particularly preferred.

Alternatively, the adhesive treatment can be RFL-based, namely, resorcin, formaldehyde and a latex where the latex preferably comprises an elastomeric material formed of a mixture of one or more copolymers, obtained from a diene monomer and a monomer containing nitrile groups, more preferably modified with a salt of an unsaturated carboxylic acid and even more preferably it is the same material forming the body.

Advantageously, the working surface of the transmission belt 101 is covered with a covering 108. The covering 108 is most advantageously selected from the group consisting of woven fabrics or knitted fabrics, non-woven fabrics.

The toothing 105 covering fabric 108 or the optional back covering fabric 110 can be formed of one or more layers and can be obtained by various weaving techniques, for example, by the weaving technique known as 2×2 twill.

The covering fabrics 108, 110 preferably have a structure formed of a weft and a warp.

More advantageously if a woven fabric is used, the covering 108, 110 comprises threads which extend substantially in the longitudinal direction of the toothed belt. Generally, said longitudinal threads are the weft threads.

Advantageously, the weft threads comprise at least one elastic thread and at least one thread with high thermal and mechanical resistance, such as for example aliphatic polyamide, aromatic polyamide or aramid, PET, polyesters, but also natural-based fabrics such as cotton, possibly even in complex or mixed structures having several threads of a chemical nature twisted one on top of the other.

The elastic thread is used to facilitate the extension of the fabric in order to follow the profile of the teeth during the vulcanization step.

Even more advantageously, the weft threads comprise an elastic thread and at least a first and a second thread, more preferably the first and second threads are polyamides, even more preferably they are made of an aliphatic polyamide such as polyamide 6 and an aromatic polyamide, such as for example a poly-para-aramid, as for example illustrated in the patent EP0965271.

In a preferred embodiment both threads that are twisted around the elastic thread or threads are made of polyaramide.

In a particularly preferred embodiment of the invention the working surface is covered with a fabric in which a first thread of polyaramide fibres is twisted around an elastic thread in a first direction S and a second thread of polyaramide fibres is twisted around the first thread in an opposite direction Z.

Advantageously, the weft threads comprise para-polyaramide fibres.

For example, the weft threads can be formed of twisting a pair of para-polyaramide threads, for example Technora threads, around a polyurethane thread.

Advantageously, the warp threads comprise meta-polyaramide fibres.

The fabric 108, 110 is generally subjected to a plurality of treatments.

Said treatments have proved to be very advantageous so that the belt is suited to have a long life in continuous contact with oil at high temperatures.

Advantageously, a first treatment can be based on polyisocyanates useful for making the polyaramide fibres and therefore the entire fabric adhere to the body elastomers.

Advantageously, the fabric 108, 110 is subsequently subjected to a second treatment with RFL.

Also in this case the latex is preferably an elastomeric material formed of a mixture of one or more copolymers, obtained from a diene monomer and a monomer containing nitrile groups, modified with a salt of an unsaturated carboxylic acid.

Advantageously, the fabric 108, 110 is also subjected to a third treatment based on a rubber, known as cement, preferably comprising an material, elastomeric more preferably a hydrogenated nitrile rubber, even more preferably an elastomeric material formed of a mixture of one or more copolymers, obtained from a diene monomer and a monomer containing nitrile groups, modified with a salt of an unsaturated carboxylic acid and even more preferably the same elastomeric material forming the body.

Furthermore, preferably the fabric 108 of the working surface 105 of the toothed belts 101 of the present invention is coated with a fourth treatment, even more preferably said treatment forms a layer 109 which is for example calendered over the fabric to form a distinct layer.

Said layer 109 preferably comprises a fluorinated polymer, for example PTFE, and a treatment elastomer, for example a material similar to that used for the body compound or a fluoroelastomer.

Advantageously, therefore, as elastomers for the fourth treatment one or more copolymers formed of a monomer containing nitrile groups and a diene and more preferably an elastomeric material formed of a mixture of one or more copolymers, obtained from a monomer diene and a monomer containing nitrile groups, modified with a salt of an unsaturated carboxylic acid and even more preferably the same elastomeric material used as the main elastomer in the compound forming the body can be used.

By suitably choosing the quantities of materials of which the fourth treatment is made up, a covering layer is conveniently formed which is distinct and separate from the fabric itself, also referred to as the resistant layer 109 hereinafter.

Advantageously, the elastomeric material is provided in the resistant layer 109 in a greater quantity in phr than the sum of the fluorinated elastomer and the second elastomeric material.

The thickness of the resistant layer 109 is advantageously comprised between 0.03 mm and 0.3 mm.

The resistant layer 109 can be arranged over the fabric 108 in different ways. It is preferably arranged by means of a calendering step.

An adhesive material can be arranged between the fabric 109 and the resistant layer 108 to improve the adhesion of the resistant layer 109 to the fabric 108.

Preferably the resistant layer 108 to ensure the necessary resistance has a weight comprised between 200 and 400 $g/m^2$.

Preferably also the back 107 of the belt is covered with a covering fabric 110, even more preferably the fabric on the work surface 105 and on the back 107 are the same and are treated with the same treatments and with the same materials.

Preferably, also the fabric 110 covering the back 107 is treated with different treatments. It has particularly advantageous to treat the back 107 with a treatment similar to the fourth treatment of the fabric 108 covering the work surface 105 described above. More advantageously, said fourth treatment forms a resistant layer over the fabric. Even more preferably, the resistant layer which covers the fabric 110 covering the back 107 is the same as that which covers the fabric 108 covering the teeth.

Preferably, both in warp and in weft, a fabric with dtex ranging from 25 to 250 dtex, more preferably from 30 to 110 dtex is used.

From an examination of the characteristics of the belt made according to the present invention the advantages which the latter obtains are evident.

By using a toothed transmission belt, considerable improvements have been obtained according to the present invention and, in particular, it has been possible to overcome the above-mentioned drawbacks. In particular, due to the use of an elastomeric material formed of a mixture of one or more copolymers, obtained from a diene monomer and a monomer containing nitrile groups, modified with a salt of an unsaturated carboxylic acid, it is possible to have a longer duration of the belt.

In particular it has been noted that when a second body is used comprising at least 60% by weight with respect to the total weight of the body in an elastomeric material formed of a mixture of one or more copolymers, obtained from a diene monomer and a monomer containing nitrile groups, modified with a salt of an unsaturated carboxylic acid, the tensile strength is advantageously greater than 40 MPa, more advantageously greater than 45 MPa, even more advantageously greater than 50 MPa, whereas, when a body comprising 30% by weight with respect to the total weight of the body is used in an elastomeric material formed of a mixture of one or more copolymers, obtained from a diene monomer and a monomer containing nitrile groups, modified with a salt of an unsaturated carboxylic acid, the tensile strength is at most 30 MPa.

If unmodified HNBR is used the modulus is even lower.

The invention will be described hereinafter by means of examples, but is not intended to be limited thereto.

EXAMPLE 1 AND COMPARATIVE EXAMPLES 2 AND 3

The belt according to the invention of example 1 comprises a body made with the compound of table 1.

ZSC2195 is an elastomeric material formed of a mixture of one or more copolymers, obtained from a diene monomer and a monomer containing nitrile groups, modified with a salt of an unsaturated carboxylic acid. In particular, the ZEON product called Zeoforte® Super Composite ("ZSC")

by Nippon is a nanotechnological polymeric alloy obtained by means of a high dispersion of a zinc salt of an unsaturated carboxylic acid in Zetpol©, namely, a hydrogenated NBR.

TABLE 1

| | phr | % |
|---|---|---|
| ZSC 2195 | 100 | 81.97 |
| Peroxide | 10 | 8.20 |
| Aramid fibres | 10 | 8.20 |
| carbon black | 2 | 1.64 |

The belt further comprises hybrid cords of the type described above wherein carbon fibres are surrounded by glass fibres with the configuration 22 tex 3*12, 400 Tex*1.

The belt covering fabric is made of polyamide 66 with a raw weight of 480 gr/$m^2$ and is treated with a HNBR compound, The treatments of the fabric are: a HNBR coating, followed by a treatment with a RFL (resorcin and formaldehyde latex) solution with CSM-based latex and adhesive, followed by a covering with a layer of PTFE and elastomer.

The toothing is then covered with a resistant layer comprising 100 HNBR parts and 125 PTFE parts.

The belt also comprises a back fabric made of nylon polyamide 66 360 g/$m^2$ treated with an RFL solution in which the latex is HNBR-based.

The comparison belt of comparative example 1 is a belt equal to the belt of the invention in which, however, the composition of the body is that shown in table 2.

TABLE 2

| | phr | % |
|---|---|---|
| HNBR | 100 | 81.97 |
| Peroxide | 10 | 8.20 |
| Aramid fibres | 10 | 8.20 |
| carbon black | 2 | 1.64 |

The comparison belt of comparative example 2 is a Gates Polychain GT Carbon belt model or part number 1200 PCGT8M 21 re-cut to 15 mm having a polyurethane body.

The test belts are toothed belts having an 8 mm pitch and 15 mm width.

Figure 3:
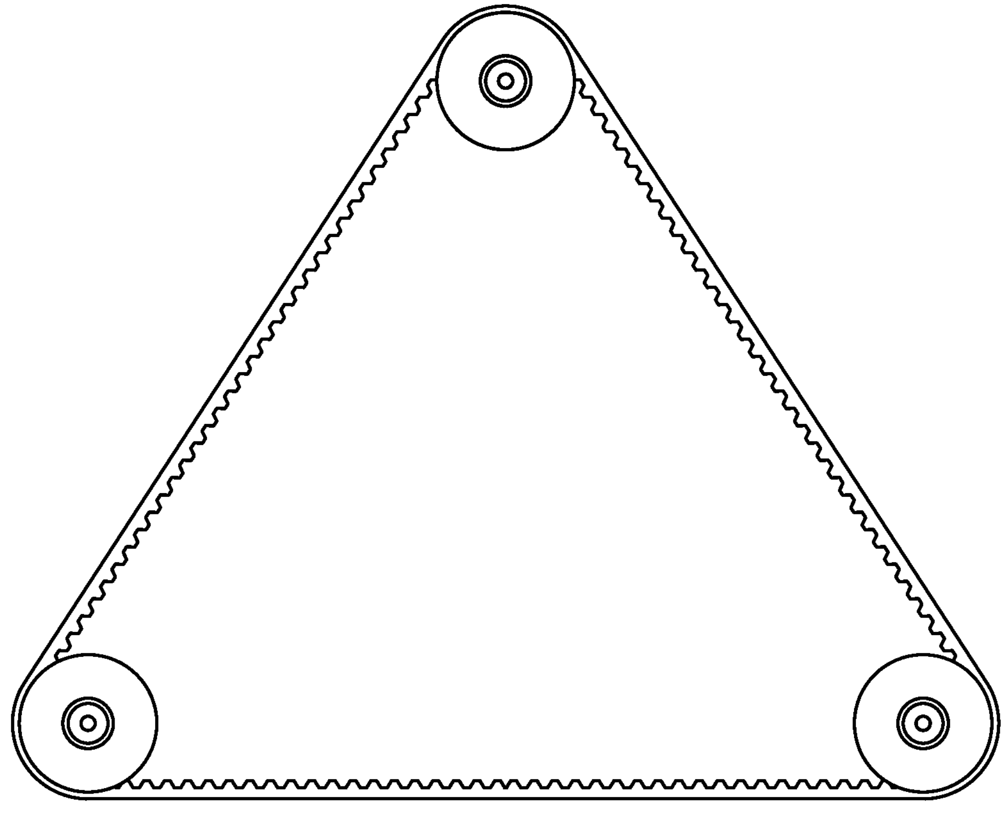
FIG. 3 is a transmission system used for the test, the results of which are illustrated in FIG. 2.

The test to which the three belts are subjected is a constant torque test which takes place by assembling the belts in the transmission system illustrated in FIG. 3.

The drive pulley rotates at 6000 revolutions per minute (RPM). The number of work cycles of the belt is calculated as:

6000 rpm*60 min*number of test hours*22 (pulley teeth)/150 (belt teeth)=Work cycles of the belt Each test is associated with a specific installation voltage, a resistant torque and consequently a specific transmitted power. By way of example, the test with a power transmission of 13.2 kW is carried out with an installation voltage of 475 N/branch and corresponds to a resistant torque of 21 Nm. The three pulleys (driving, driven and idler) are all the same and have 22 teeth.

Figure 2:
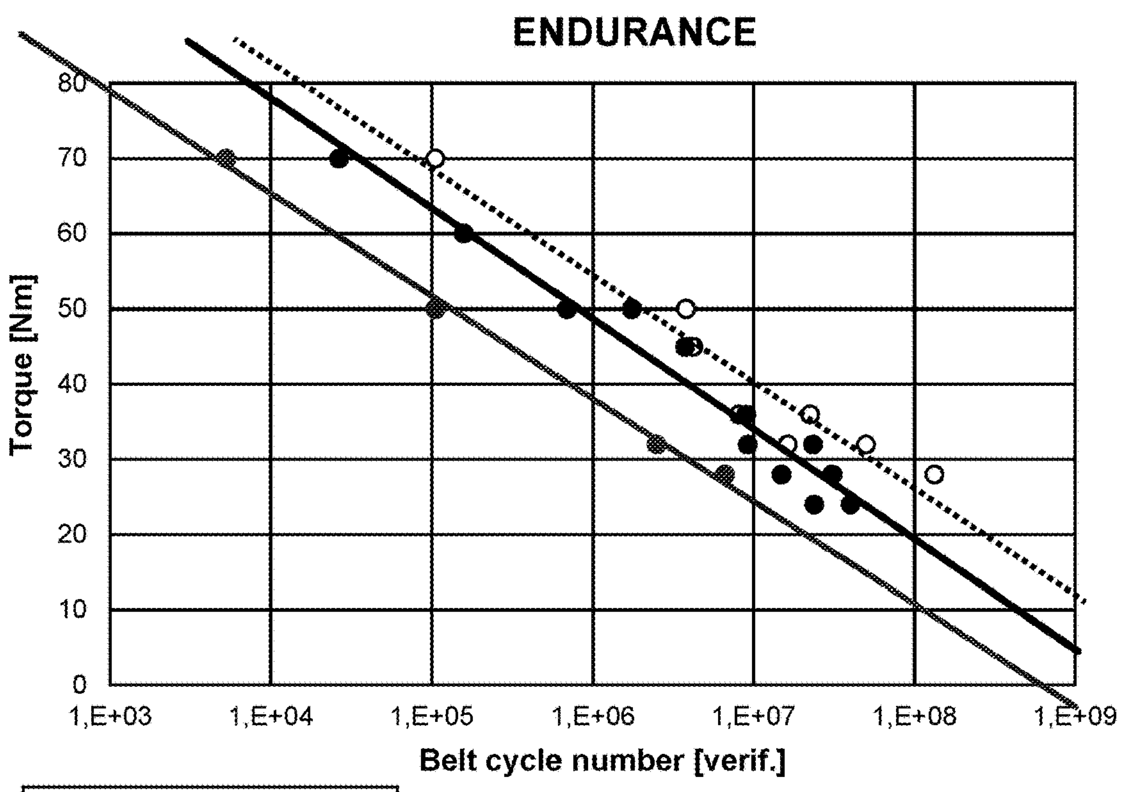
FIG. 2 is a graph illustrating the results of an endurance test.

The graph of FIG. 2 is obtained where each point corresponds to a tested belt and, in particular, to breakage and from which it can be noted that the belt according to the present invention always accomplishes better results in terms of number of revolutions performed for the same torque compared to comparative examples 1 and 2.

The invention claimed is:

1. A power transmission belt comprising:

a body, a plurality of cords embedded in the body, a back, and a plurality of teeth or ribs, wherein said back or said teeth is covered with a covering, wherein the body comprises, for at least 60% by weight with respect to the total weight of the body, an elastomeric material formed of a mixture of one or more copolymers, wherein each copolymer is obtained from a diene monomer, and a monomer containing nitrile groups modified with a salt of an unsaturated carboxylic acid, and the body has a tensile strength of more than 40 MPa.

2. The transmission belt according to claim 1, wherein said covering material comprises a treatment comprising an elastomeric material formed of a mixture of the one or more copolymers.

3. The transmission belt according to claim 1, wherein said covering material comprises a material selected from the group consisting of woven fabrics, knitted fabrics and non-woven fabrics.

4. The transmission belt according to claim 1, wherein said body comprises, for at least 70% by weight with respect to the total weight of the body, an elastomeric material formed of a mixture of the one or more copolymers.

5. The transmission belt according to claim 1, wherein said body comprises, for at least 80% by weight with respect to the total weight of the body, an elastomeric material formed of a mixture the one or more copolymers.

6. The transmission belt according to claim 1, wherein said body comprises fibres in a percentage by weight ranging from 1 to 20% with respect to the total weight of the body.

7. The transmission belt according to claim 6, wherein said fibres comprise a material selected from the group consisting of glass fibres, aramid fibres, polyester fibres, carbon fibres, PBO fibres, polyamide fibres, polyketone (POK) fibres, PEEK fibres, polyvinyl acetate (PVA) fibres, liquid crystal (LPC) fibres, PEN fibres, and combinations thereof.

8. The transmission belt according to claim 1, wherein said plurality of cords comprise at least one substance selected from the group consisting of polyamide, aromatic polyamide, polyester, glass, PBO, carbon fibres.

9. The transmission belt according to claim 1, wherein said plurality of cords comprise a first fibrous material and a second fibrous material.

10. The transmission belt according to claim 1, wherein said plurality of cords comprise carbon fibres or PBO fibres.

11. A power transmission system comprising a belt according to claim 1.

* * * * *